United States Patent
Shen et al.

(10) Patent No.: US 9,794,094 B2
(45) Date of Patent: Oct. 17, 2017

(54) RADIO BASE STATION, USER TERMINAL AND RADIO COMMUNICATION METHOD

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/028,269

(22) PCT Filed: Oct. 8, 2014

(86) PCT No.: PCT/JP2014/076924
§ 371 (c)(1),
(2) Date: Apr. 8, 2016

(87) PCT Pub. No.: WO2015/053306
PCT Pub. Date: Apr. 16, 2015

(65) Prior Publication Data
US 2016/0269206 A1    Sep. 15, 2016

(30) Foreign Application Priority Data

Oct. 9, 2013 (JP) .................................. 2013-212301

(51) Int. Cl.
*H04L 27/00* (2006.01)
*H04W 16/32* (2009.01)

(52) U.S. Cl.
CPC ......... *H04L 27/0014* (2013.01); *H04W 16/32* (2013.01); *H04L 2027/0055* (2013.01);
(Continued)

(58) Field of Classification Search
CPC .. H04W 16/32; H04W 56/002; H04L 27/0014
See application file for complete search history.

(56) References Cited

U.S. PATENT DOCUMENTS

2007/0010197 A1   1/2007   Yokosawa et al.
2008/0080650 A1   4/2008   Adachi
(Continued)

FOREIGN PATENT DOCUMENTS

EP      2779729 A1      9/2014
JP    2007-019807 A     1/2007
(Continued)

OTHER PUBLICATIONS

International Search Report issued in PCT/JP2014/076924 mailed on Dec. 16, 2014 (2 page).
Written Opinion of the International Searching Authority issued in PCT/JP2014/076924 mailed on Dec. 16, 2014 (5 pages).
(Continued)

*Primary Examiner* — Myron K Wyche
(74) *Attorney, Agent, or Firm* — Osha Liang LLP

(57) ABSTRACT

To actualize frequency synchronization with each of radio communication systems while suppressing increase in circuit scale of a user terminal in an environment in which the user terminal concurrently communicates with a plurality of radio communication systems with different frequencies, a radio base station of the present invention is a radio base station for forming a narrow-area cell to communicate with a user terminal in a radio communication system where the narrow-area cell is provided inside a wide-area cell, and has a carrier frequency synthesizer that generates a carrier frequency of the narrow-area cell based on a wide-area radio signal transmitted from a radio base station for forming the wide-area cell, and a sampling frequency synthesizer that generates a sampling frequency of a baseband signal of the narrow-area cell based on the wide-area radio signal.

11 Claims, 11 Drawing Sheets

(52) U.S. Cl.
CPC ............... *H04L 2027/0065* (2013.01); *H04L 2027/0083* (2013.01)

(56) References Cited

U.S. PATENT DOCUMENTS

| | | | |
|---|---|---|---|
| 2009/0135804 A1* | 5/2009 | Swarts | H04W 56/0085 370/350 |
| 2010/0069122 A1 | 3/2010 | Ito | |
| 2011/0275402 A1 | 11/2011 | Charipadi et al. | |
| 2012/0182909 A1* | 7/2012 | Yamamoto | H04W 56/002 370/281 |
| 2012/0183109 A1* | 7/2012 | Yang | H04B 1/109 375/350 |
| 2013/0021973 A1* | 1/2013 | Aziz | H04L 5/0016 370/328 |
| 2014/0307689 A1 | 10/2014 | Kishiyama | |

FOREIGN PATENT DOCUMENTS

| | | |
|---|---|---|
| JP | 2008-092338 A | 4/2008 |
| JP | 2010-068496 A | 3/2010 |
| JP | 2011-101347 A | 5/2011 |
| JP | 2011-114386 A | 6/2011 |
| JP | 2011-223444 A | 11/2011 |
| WO | 2012/027880 A1 | 3/2012 |
| WO | 2013/069761 A1 | 5/2013 |

OTHER PUBLICATIONS

3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

Extended European Search Report issued in corresponding European Application No. 14851644.6, mailed May 9, 2017 (7 pages).

* cited by examiner

RADIO BASE STATION, USER TERMINAL AND RADIO COMMUNICATION METHOD

TECHNICAL FIELD

The present invention relates to a radio base station, user terminal and radio communication method in the next-generation mobile communication system.

BACKGROUND ART

In LTE (Long Term Evolution) with the aims of high-speed data rates, low delay and the like and a successor system (for example, also referred to as LTE-Advanced, FRA (Future Radio Access), 4G and the like) to LTE, radio communication systems (for example, also referred to as Het Net (Heterogeneous Network)) have been studied in which a small cell (including a picocell, femtocell and the like) having relatively small coverage with a radius of about several meters to several tens of meters is arranged, while overlapping a macrocell having relatively large coverage with a radius of about several hundreds of meters to several kilometers (for example, Non-patent Literature 1).

In such a radio communication system are studied a scenario (for example, also referred to as co-channel) using the same frequency band in both the macrocell and the small call, and another scenario (for example, also referred to as separate frequency) using different frequency bands in the macrocell and the small cell. More specifically, in the latter scenario, it is studied that a relatively low frequency band (for example, 2 GHz) (hereinafter, referred to as low-frequency band) is used in the macrocell, and that a relatively high frequency band (for example, 3.5 GHz and 10 GHz) (hereinafter, referred to as high-frequency band) is used in the small cell.

CITATION LIST

Non-Patent Literature

Non-Patent Literature 1: 3GPP TR 36.814 "E-UTRA Further advancements for E-UTRA physical layer aspects"

SUMMARY OF INVENTION

Technical Problem

In addition, in the radio communication system, in order for a user terminal to perform radio communications with a radio base station, it is necessary to perform frequency synchronization. Generally, the user terminal receives a synchronization signal transmitted from the radio base station in executing a cell search, and frequency synchronization is thereby performed.

In the case where a plurality of radio communication systems with different frequencies exists such as an environment in which a macrocell using a low-frequency band and a small cell using a high-frequency band coexist, when a user terminal selects one of the radio communication systems to connect, the user terminal is required to perform frequency synchronization with only the one of the radio communication systems. However, in the case of concurrently connecting to a plurality of radio communication systems with different frequencies, the user terminal needs to perform frequency synchronization with a plurality of radio communication systems. Therefore, the user terminal needs to be provided with circuits for frequency synchronization corresponding to respective radio communication systems, and there is a problem that the circuit scale of the user terminal increases.

The present invention was made in view of such a respect, and it is an object of the invention to provide a radio base station, user terminal and radio communication method for enabling frequency synchronization with each of radio communication systems to be actualized while suppressing increase in circuit scale of a user terminal, in an environment in which the user terminal concurrently communicates with a plurality of radio communication systems with different frequencies.

Solution to Problem

A radio base station of the present invention is a radio base station for forming a narrow-area cell to communicate with a user terminal in a radio communication system where the narrow-area cell is provided inside a wide-area cell, and is characterized by having a carrier frequency synthesizer that generates a carrier frequency of the narrow-area cell based on a wide-area radio signal transmitted from a radio base station for forming the wide-area cell, and a sampling frequency synthesizer that generates a sampling frequency of a baseband signal of the narrow-area cell based on the wide-area radio signal.

Advantageous Effects of Invention

According to the present invention, in an environment in which a user terminal concurrently communicates with a plurality of radio communication systems with different frequencies, it is possible to actualize frequency synchronization with each of the radio communication systems, while suppressing increase in circuit scale of the user terminal.

DESCRIPTION OF EMBODIMENTS

Figure 1:
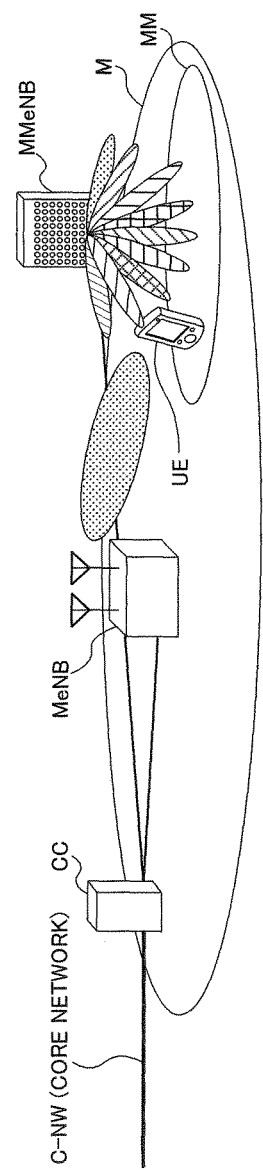
FIG. 1 is a diagram showing one example of a network configuration to which is applied a radio base station according to this Embodiment.

FIG. 1 is one example of a conceptual diagram of a network configuration to which is applied a radio base station (MMeNB) according to this Embodiment. Referring to FIG. 1, described is a configuration that a user terminal concurrently connects to a plurality of radio communication systems in radio communication systems in which a narrow-area cell is provided inside a wide-area cell. In this Embodiment, the wide-area cell (macrocell M) is formed with a macro base station (MeNB), and the narrow-area cell (Massive-MIMO cell MM) is formed with the MM base station (MMeNB). FIG. 1 illustrates the network configuration where the Massive-MIMO cell MM is overlaid and formed on the cell area of the macrocell M. In addition, network configurations to which the MM base station according to this Embodiment is applied are not limited to the configuration as shown in FIG. 1.

The MMeNB performs signal transmission on a user terminal UE positioned inside the Massive-MIMO cell MM in a high-frequency band by a MIMO transmission scheme (Massive MIMO (Multi Input Multi Output), hereinafter expressed as "Massive-MIMO transmission scheme") using a large number of antenna elements. More specifically, by controlling amplitude and phase of each transmission signal using a plurality of antenna elements, the MM base station is capable of forming (beam forming) a transmission beam having directivity for each user terminal to perform signal transmission. Use of the Massive-MIMO transmission scheme is studied in mobile communication systems subsequent to LTE-A.

In the Massive-MIMO transmission scheme, a data rate (frequency usage efficiency) is increased by transmitting data using a large number (for example, 100 or more) of antenna elements. Since data is transmitted using a large number of antenna elements, it is possible to improve transmission efficiency associated with multiplexing as compared with the case of using a small number of antenna elements, and it is possible to perform radio communication at higher speed than conventional communication. Further, sophisticated beam forming is made possible by combinations of a large number of antenna elements.

Herein, the beam forming (BF) is a technique for controlling amplitude and phases of respective transmission/reception signals in a plurality of antenna elements, thereby providing a transmission/reception beam with directivity, and also enabling a shape of the beam to be changed. In this beam forming, generally, as the number of antenna elements increases, it is possible to perform more sophisticated control. In other words, corresponding to the number of antenna elements, it is possible to control the number of beams, the shape of each beam (width of the beam in a horizontal plane, width of the beam in a vertical plane, etc.) and the direction and gain of the beam in detail. For example, by narrowing the width of the beam (i.e. forming a narrow beam), it is possible to obtain high gain (power density). Accordingly, by applying the beam forming, it is possible to change the coverage area of the Massive-MIMO cell MM.

The user terminal (UE) is configured to be able to communicate with the macro base station for forming the macrocell M when the terminal is positioned inside the macrocell M, and when the terminal is positioned inside the Massive-MIMO cell MM, is configured to be able to communicate with the MM base station in addition to the macro base station. Thus, performing communications concurrently using a plurality of radio communication systems with different usage frequencies is also called Link aggregation. In addition, the user terminal in this Embodiment includes a mobile terminal apparatus and fixed terminal apparatus.

In the network configuration as shown in FIG. 1, the macro base station and MM base station are connected to a central control station (CC). The central control station is connected to a core network. For example, the central control station includes an access gateway apparatus, Radio Network Controller (RNC), Mobility Management Entity (MME) and the like. In addition, such a configuration may be made where a part or the whole of functions of the central control station are provided in the macro base station.

In the configuration as shown in FIG. 1, for example, a C (Control)-plane for handling control messages is supported by the macrocell M. On the other hand, a U (User)-plane for handling user data is supported by the Massive-MIMO cell MM. Further, in the configuration as shown in FIG. 1, it is possible to operate the macrocell M and Massive-MIMO cell MM with different frequency bands. For example, it is possible to operate the C-plane supported by the macrocell M with a low-frequency band (for example, 2 GHz-band), and operate the U-plane supported by the Massive-MIMO cell MM with a high-frequency band (for example, 10 GHz-band).

Further, as shown in FIG. 1, when the user terminal is capable of connecting to both the macro base station and the MM base station, it is possible to split the C-plane and the U-plane to control. For example, the macro base station transmits control information required for reception of user data (data signal) to the user terminal, while the MM base station is capable of transmitting the user data. Further, while the macro base station transmits a part of control information, the MM base station is capable of transmitting the rest of the control information and user data.

In addition, in the configuration to concurrently connect to a plurality of radio communication systems with different usage frequencies as shown in FIG. 1, a user terminal needs to perform frequency synchronization with a plurality of radio communication systems. Therefore, the user terminal needs to be provided with circuits for frequency synchronization corresponding to respective radio communication systems, and there is a problem that the circuit scale of the user terminal increases.

Then, the inventors of the present invention conceived that the MM base station acquires a radio signal (hereinafter, referred to as macro-signal) of the macrocell, and based on a frequency of the macrocell, corrects a carrier frequency of a radio signal (hereinafter, referred to as MM signal) of the Massive-MIMO cell and a sampling frequency of a baseband signal, and that a user terminal performs frequency synchronization with only the macrocell, and is thereby capable of achieving frequency synchronization with the Massive-MIMO cell. According to this configuration, the user terminal is required to be provided with only a circuit for frequency synchronization for the macrocell, and as compared with the case of being provided with circuits for frequency synchronization for both the macrocell and the Massive-MIMO cell, it is possible to suppress increase in the circuit scale.

More specifically, the MM base station receives a high-frequency signal of the macrocell, and extracts respective differences between a carrier frequency and sampling frequency of the macrocell acquired from the signal, and a carrier frequency generated based on a carrier frequency reference signal of the MM base station and a sampling frequency of a baseband signal generated based on a sampling frequency reference signal. Then, using the extracted frequency differences, the station corrects the carrier frequency of the MM cell (Massive-MIMO cell) and the sampling frequency of the baseband signal to generate. In addition, the baseband signal refers to a signal obtained by coding a data signal, and the high-frequency signal refers to a signal obtained by multiplying the baseband signal by a carrier.

This Embodiment will specifically be described below with reference to drawings. In the following drawings, it is intended to mainly show the macro base station (MeNB), MM base station (MMeNB) and user terminal (UE), and configurations (for example, central control station and the like) unnecessary for the description are omitted. Further, the UE is assumed as equipment capable of connecting to the MeNB and MMeNB. Hereinafter, for convenience, the "sampling frequency of the baseband signal" is abbreviated as "sampling frequency".

In addition, the radio base station according to this Embodiment is not limited to the MM base station, and may be a small base station for forming a small cell and the like. Further, the radio base station for forming the wide-area cell is also not limited to the macro base station. Furthermore, the wide-area cell and narrow-area cell according to this Embodiment are assumed to be different in the usage frequency, and may have the same frequency.

Figure 2:
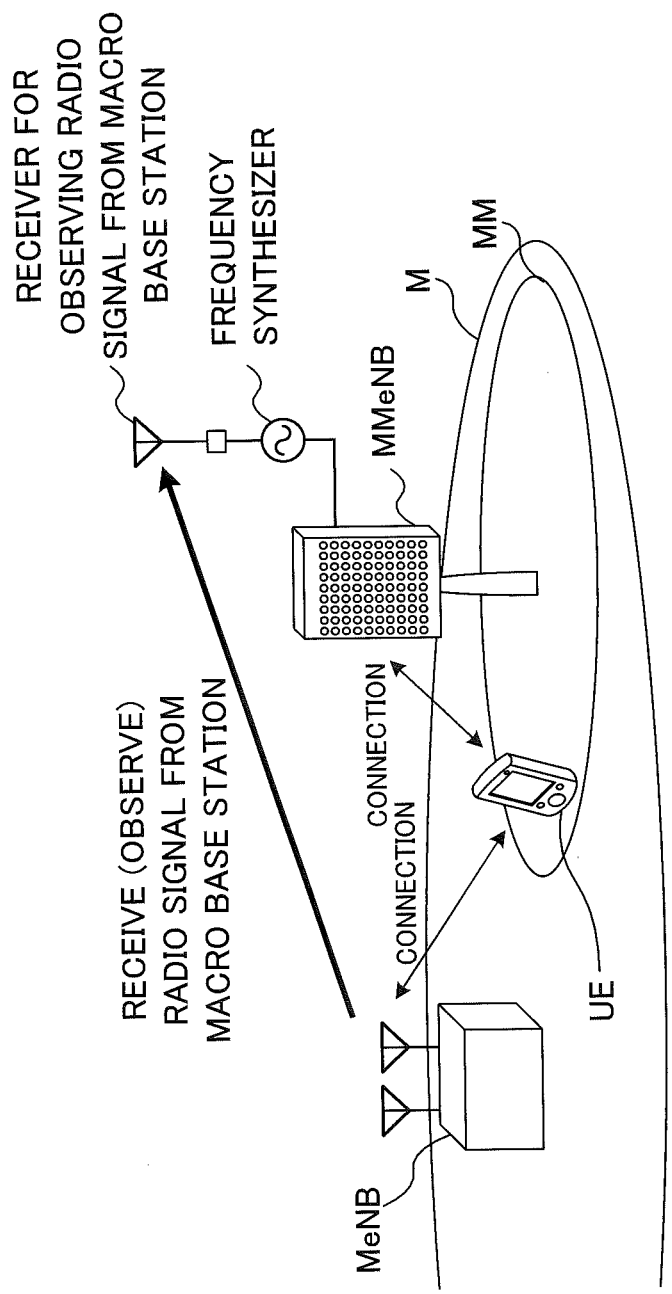
FIG. 2 is a schematic explanatory diagram of a basic configuration of this Embodiment.

FIG. 2 is a schematic explanatory diagram of a basic configuration of this Embodiment. As shown in FIG. 2, the radio base station (MM base station) according to this Embodiment has a receiver to observe a radio signal (macro-signal) from the macro base station, and a frequency synthesizer for adjusting a reference signal to generate a carrier frequency and a sampling frequency of the MM cell based on the received radio signal. In this Embodiment, the macrocell signal is a wide-area radio signal.

The MM base station communicates with a user terminal, using the carrier frequency and sampling frequency of the MM cell corrected based on the macro-signal. By this means, based on the macro-signal, the user terminal generates the carrier frequency and sampling frequency of the MM cell from a reference signal, and is capable of performing frequency synchronization with the MM base station.

Figure 3:
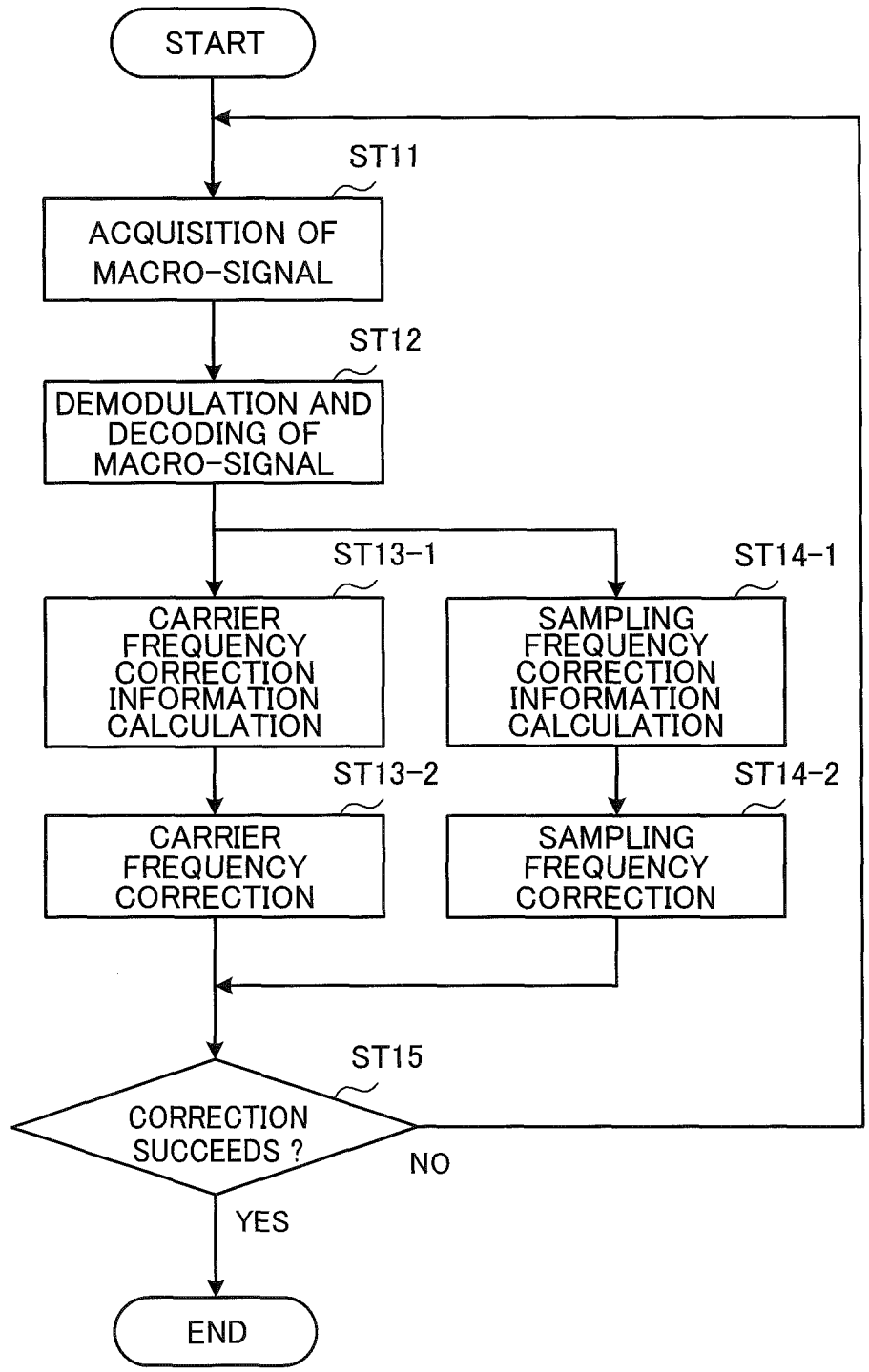
FIG. 3 is an operation flowchart of frequency synchronization correction of a radio base station according to this Embodiment.

FIG. 3 is an operation flowchart of frequency synchronization correction of the radio base station according to this Embodiment. In this Embodiment, the frequency synchronization correction is assumed to be executed at predetermined time intervals, but the invention is not limited thereto. For example, such a configuration may be made that the correction is executed corresponding to control information from a higher node (central control station and the like).

First, the MM base station acquires a macro-signal (step ST11), and demodulates and decodes the acquired macro-signal (step ST12). Herein, while demodulating and decoding the macro-signal, the station acquires a carrier frequency of the macrocell and a sampling frequency of the macrocell.

Next, the station performs the correction of the carrier frequency and sampling frequency (steps ST13, ST14). For the correction of the carrier frequency, the station calculates carrier frequency correction information (step ST13-1). The carrier frequency correction information is information to correct the carrier frequency generated by the MM base station. In this Embodiment, as the carrier frequency correction information, the station extracts a difference between the carrier frequency of the macrocell and a carrier frequency of the macrocell generated based on a carrier frequency reference signal of the MM base station.

Further, using the extracted carrier frequency difference, the station corrects a carrier frequency of the MM cell (step ST13-2). As an example of a specific correction method, the station calculates a difference in the carrier frequency reference signal of the MM base station from the difference in the carrier frequency of the macrocell extracted in step ST13-1, and from the calculated difference in the reference signal, performs frequency correction in a carrier frequency synthesizer, high-frequency section or the like of the MM base station.

For example, an example is considered that the carrier frequency reference signal of the MM base station is 10 MHz, an ideal carrier frequency of the MM cell is 20 GHz, and that an ideal carrier frequency of the macrocell is 3.5 GHz. In step ST13-2, in the case where a difference of 5 MHz is extracted in the carrier of 3.5 GHz generated from the reference signal of 10 MHz of the MM base station, calculation is made that a difference of 5 MHz/(3.5 GHz/10 MHz)=14.3 kHz exists in the reference signal of the MM base station. Then, in the case of generating a carrier of 20 GHz of the MM base station, the correction is applied in consideration of the difference of 14.3 kHz in the reference signal. In the correction in this case, a correction of 14.3 kHz*(20 GHz/10 MHz)=28.6 MHz may be made to 20 GHz generated from the reference signal. By this means, the actual carrier frequency ratio between the MM cell and the macrocell (20.0286 GHz:3.505 GHz) is equal to the ideal carrier frequency ratio between the MM cell and the macrocell (20 GHz:3.5 GHz).

On the other hand, also for correction of the sampling frequency, the station calculates sampling frequency correction information (step ST14-1). The sampling frequency correction information is information to correct the sampling frequency generated by the MM base station. In this Embodiment, as the sampling frequency correction information, the station extracts a difference between a sampling frequency obtained by demodulating the received macro-signal and a sampling frequency of the macrocell generated based on a sampling frequency reference signal of the MM base station.

Further, using the extracted sampling frequency difference, the station corrects a sampling frequency of the MM cell (step ST14-2). As an example of a specific correction method, the station calculates a difference in the sampling frequency reference signal of the MM base station from the difference in the sampling frequency of the macrocell extracted in step ST14-1, and from the calculated difference in the reference signal, performs frequency correction in a sampling frequency synthesizer, baseband section or the like of the MM base station.

Next, after completing the correction of the frequency, the station determines whether the correction succeeded (step ST15). For example, in the case where the user terminal connected to the MM base station transmits reception quality of the MM signal to the MM base station as feedback, and the reception quality is predetermined quality or more, it is possible to determine that the correction succeeded. Herein, as the reception quality, CQI (Channel Quality Indicator), SINR (Signal to Interference plus Noise Ratio), RSRP (Reference Signal Received Power), RSRQ (Reference Signal Received Quality) and the like may be used.

Further, the reception quality may be an instantaneous value or may be a long-term average value.

Further, the user terminal may notify the macro base station of information indicative of quality of the MM signal, the macro base station may notify the MM base station of the information, and the MM base station may thereby determine success of the correction. Furthermore, the user terminal may notify the macro base station of information indicative of quality of the received MM signal, the macro base station may further notify the higher node, the higher node may notify the MM base station of the information, and the MM base station may thereby determine success of the correction. Moreover, when the MM base station has a transmission section of macro-signal, the MM base station may transmit a radio signal to the macro base station to determine success of the correction with a signal notified from the macro base station corresponding to the radio signal. For example, when the macro-signal transmitted from the MM base station has a deviation in the frequency from the macro-signal that the macro base station transmits, the macro base station may notify the MM base station of re-execution of the correction, or may specifically notify of a correction amount of the frequency.

In addition, when the frequency difference obtained in step ST13-1 or ST14-1 is the same as in the previous frequency synchronization correction, the correction processing in step ST13-2 and ST14-2 may be made the same as the previous processing, and the determination in step ST15 may be omitted.

By this means, in an environment in which a plurality of radio communication systems with different frequencies exists, by performing frequency synchronization with only the wide-area cell (macrocell and the like) where the user terminal exists, the terminal is capable of achieving frequency synchronization also with the narrow-area cell (MM cell and the like) existing inside the wide-area cell. Therefore, even in the case where the user terminal concurrently communicates with a plurality of radio communication systems, the terminal is required to be provided with only a circuit for frequency synchronization corresponding to one radio communication system, and is capable of readily achieving frequency synchronization with each of the radio communication systems.

(Configurations of the MM Base Station and User Terminal)

Figure 4:
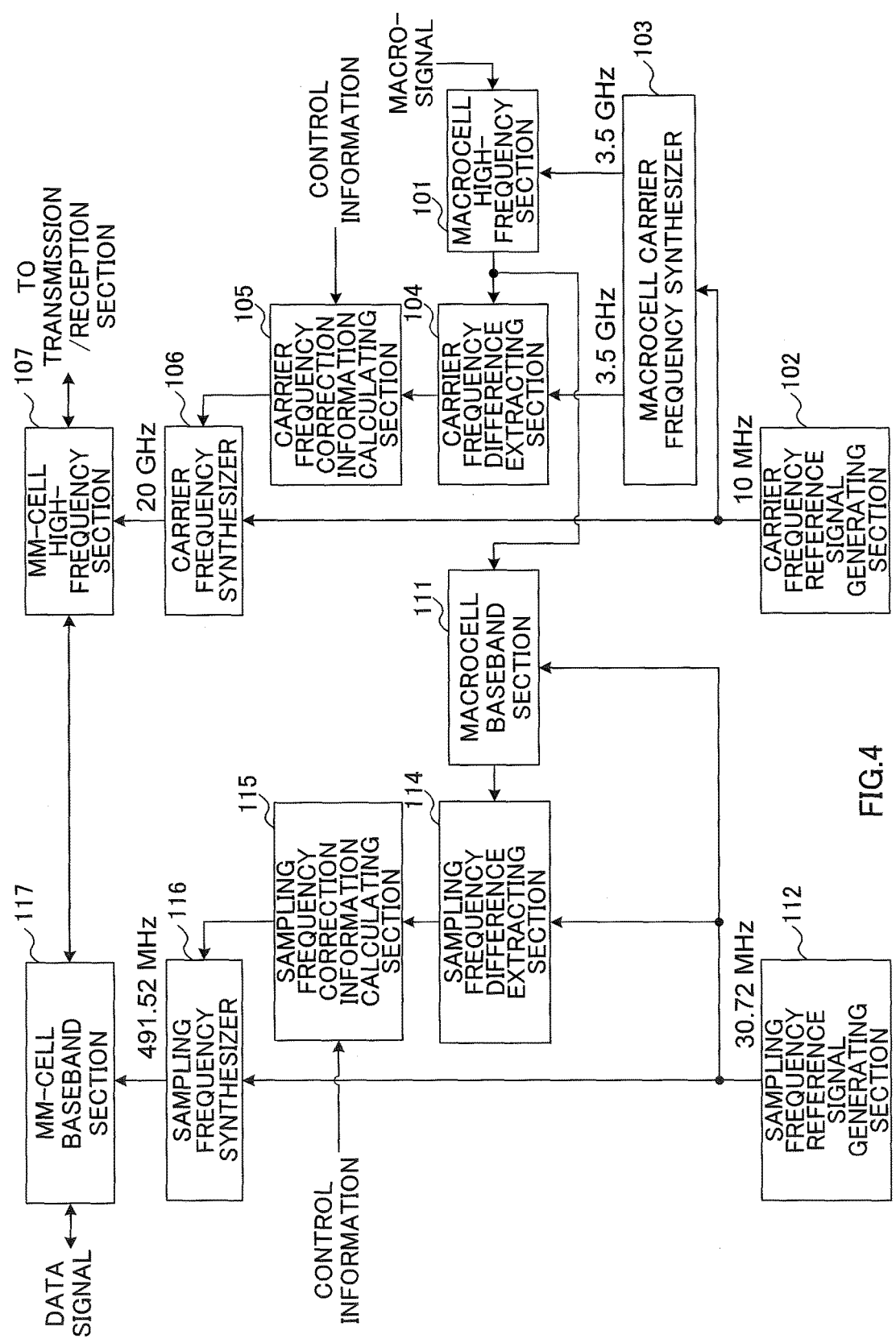
FIG. 4 is a block diagram showing one example of a configuration of the radio base station according to this Embodiment.
Figure 5:
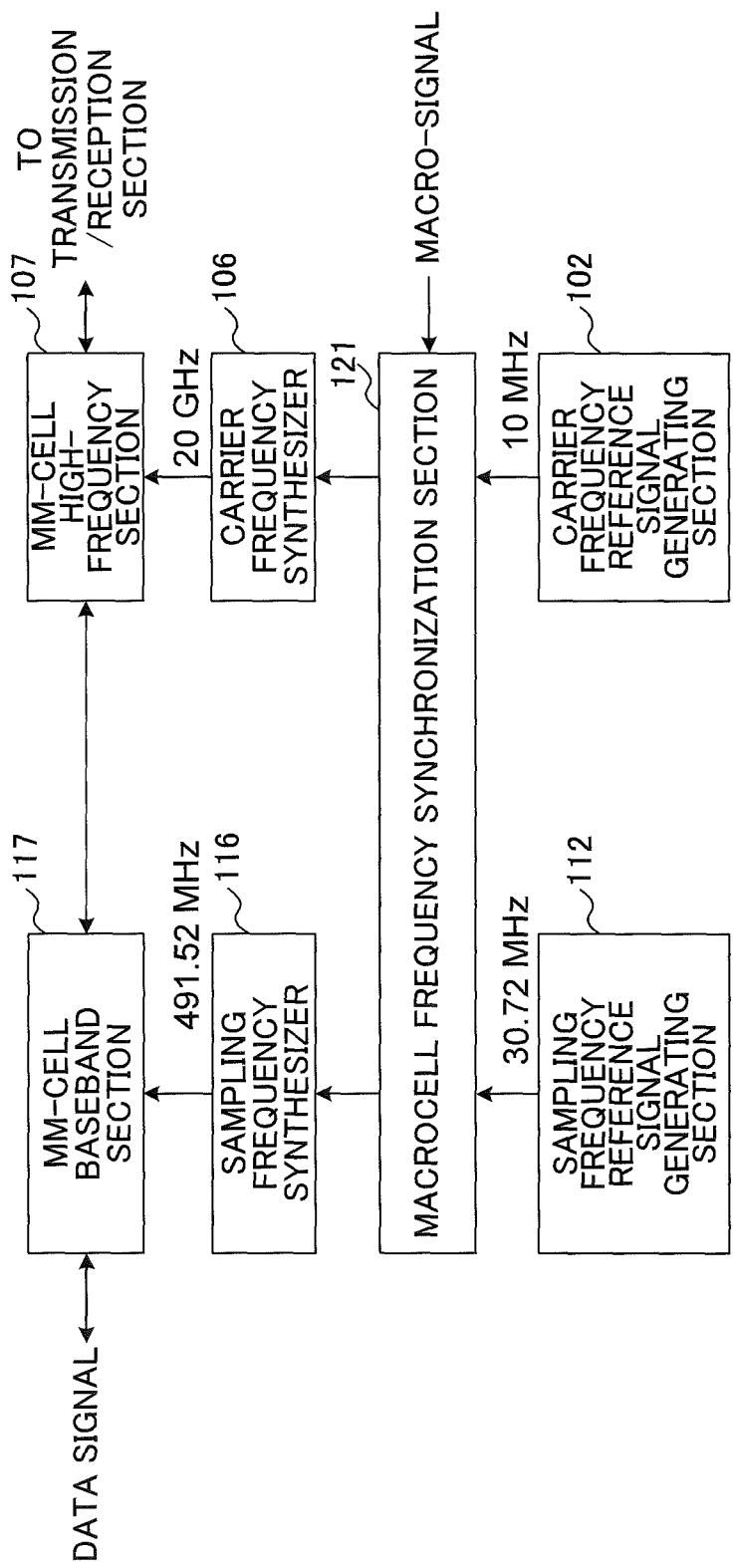
FIG. 5 is a block diagram showing one example of a configuration of a user terminal according to this Embodiment.

Described next is a configuration example of the MM base station and user terminal according to this Embodiment. FIG. 4 is a block diagram showing one example of the configuration of the MM base station. FIG. 5 is a block diagram showing one example of the configuration of the user terminal. In addition, the configurations of the MM base station and user terminal as shown in FIGS. 4 and 5 are simplified to explain feature portions of this Embodiment, and are assumed to have configurations provided in usual MM base station and user terminal, respectively. In addition, in reference signal generating sections and synthesizers as shown in FIGS. 4 and 5, as one example, frequencies of signals to output are described, but the invention is not particularly limited to these values.

As shown in FIG. 4, the MM base station has a macrocell high-frequency section 101, carrier frequency reference signal generating section 102, macrocell carrier frequency synthesizer 103, carrier frequency difference extracting section 104, carrier frequency correction information calculating section 105, carrier frequency synthesizer 106, MM-cell high-frequency section 107, macrocell baseband section 111, sampling frequency reference signal generating section 112, sampling frequency difference extracting section 114, sampling frequency correction information calculating section 115, sampling frequency synthesizer 116, and MM-cell baseband section 117.

The macrocell high-frequency section 101 receives a macro-signal from the outside, acquires a carrier frequency of the macrocell using a signal with a frequency assumed to be a macrocell carrier frequency generated in the macrocell carrier frequency synthesizer 103, and demodulates the macro-signal to a baseband signal. The acquired carrier frequency of the macrocell is output to the carrier frequency difference extracting section 104, and the baseband signal of the macrocell is output to the macrocell baseband section 111. In addition, the macrocell high-frequency section 101 may be provided with a high-frequency filter, low-noise amplifier and the like to perform various kinds of signal processing such as elimination of an interference wave except the macrocell carrier frequency band and signal amplification. Further, it is essential only that the macrocell high-frequency section 101 has the function of receiving the macro-signal, and the section 101 may further have a function of transmitting the macro-signal.

The carrier frequency reference signal generating section 102 generates a reference signal (carrier frequency reference signal) used in generation of the carrier frequency of the MM cell. For generation of the reference signal, for example, it is possible to use a quartz oscillator. The generated carrier frequency reference signal is output to the macrocell carrier frequency synthesizer 103 and carrier frequency synthesizer 106. This Embodiment shows the case of generating 10 MHz as the carrier frequency reference signal.

Using the carrier frequency reference signal input from the carrier frequency reference signal generating section 102, the macrocell carrier frequency synthesizer 103 generates the signal with the frequency assumed to be the macrocell carrier frequency to output to the macrocell high-frequency section 101 and carrier frequency difference extracting section 104. This Embodiment shows the case of generating 3.5 GHz as the assumed macrocell carrier frequency.

Based on the carrier frequency of the macrocell input from the macrocell high-frequency section 101, and the macrocell carrier frequency input from the macrocell carrier frequency synthesizer 103, the carrier frequency difference extracting section 104 extracts a difference in the carrier frequency of the macrocell to output to the carrier frequency correction information calculating section 105.

Using the difference in the carrier frequency input from the carrier frequency difference extracting section 104, the carrier frequency correction information calculating section 105 calculates the carrier frequency correction information to output to the carrier frequency synthesizer 106. As the carrier frequency correction information, for example, it is possible to use an increment value from a standard carrier frequency of the MM cell. Further, the carrier frequency correction information may be calculated in consideration of frequency characteristics in frequency conversion in the macrocell carrier frequency synthesizer 103 and carrier frequency synthesizer 106. In addition, the carrier frequency correction information may be calculated based on information about the carrier frequency other than the difference in the carrier frequency.

Herein, as the frequency correction information, information on a multiplication rate of the frequency synthesizer may be used. For example, in the case of using a PLL (Phase-Locked Loop) frequency synthesizer as the carrier frequency synthesizer 106, based on the difference in the carrier frequency, the carrier frequency correction information calculating section 105 is capable of outputting the division number of a frequency divider included in the PLL frequency synthesizer to the carrier frequency synthesizer 106 as the carrier frequency correction information.

Using the carrier frequency reference signal input from the carrier frequency reference signal generating section 102 and the carrier frequency correction information input from the carrier frequency correction information calculating section 105, the carrier frequency synthesizer 106 generates a carrier frequency to output to the MM-cell high-frequency section 107. This Embodiment shows the case of generating 20 GHz as the standard carrier frequency of the MM cell of the case including neither error nor correction.

Using the carrier frequency input from the carrier frequency synthesizer 106, the MM-cell high-frequency section 107 performs modulation and demodulation of signals. More specifically, the MM-cell high-frequency section 107 modulates a baseband signal input from the MM-cell baseband section 117 to a high-frequency signal to output to a transmission/reception section. Further, the MM-cell high-frequency section 107 demodulates a high-frequency signal input from the transmission/reception section to a baseband signal to output to the MM-cell baseband section 117.

Using the baseband signal input from the macrocell high-frequency section 101 and the sampling frequency reference signal input from the sampling frequency reference signal generating section 112, the macrocell baseband section 111 acquires a sampling frequency of the macrocell. The acquired sampling frequency of the macrocell is output to the sampling frequency difference extracting section 114. In addition, it is essential only that the macrocell baseband section 111 has the function of decoding the baseband signal of the macrocell, and the section 111 may further have a function of coding a data signal to generate the baseband signal of the macrocell.

The sampling frequency reference signal generating section 112 generates a reference signal (sampling frequency reference signal) used to generate the sampling frequency of the MM cell. For generation of the reference signal, for example, it is possible to use a quartz oscillator. The generated sampling frequency reference signal is output to the macrocell baseband section 111, sampling frequency difference extracting section 114, and sampling frequency synthesizer 116. In addition, in this Embodiment, it is assumed that a standard value of the sampling frequency of the macrocell is 30.72 MHz that is the same as the frequency of the sampling frequency reference signal. As an example in which the sampling frequency is 30.72 MHz, there is the case where a system bandwidth is 20 MHz in an LTE system.

Therefore, in contrast to that the macrocell carrier frequency is generated with the macrocell carrier frequency synthesizer 103, as the macrocell sampling frequency, it is possible to use the frequency of the sampling frequency reference signal without any modification. However, the invention is not limited to the above-mentioned configuration. For example, when the standard value of the sampling frequency of the macrocell is different from the frequency of the sampling frequency reference signal, for the sampling frequency reference signal, such a configuration may be made that the macrocell sampling frequency is generated via the macrocell sampling frequency synthesizer to output to the macrocell baseband section 111 and sampling frequency difference extracting section 114. In addition, a reference signal generating section of this Embodiment is comprised of the carrier frequency reference signal generating section 102 and sampling frequency reference signal generating section 112.

Based on the sampling frequency of the macrocell input from the macrocell baseband section 111, and the sampling frequency reference signal input from the sampling frequency reference signal generating section 112, the carrier frequency difference extracting section 114 extracts a difference in the sampling frequency of the macrocell to output to the sampling frequency correction information calculating section 115.

Using the difference in the sampling frequency input from the sampling frequency difference extracting section 114, the sampling frequency correction information calculating section 115 calculates the sampling frequency correction information to output to the sampling frequency synthesizer 116. As the sampling frequency correction information, for example, it is possible to use an increment value from a standard sampling frequency of the MM cell. Further, the sampling frequency correction information may be calculated in consideration of frequency characteristics in frequency conversion in the sampling frequency synthesizer 116. In addition, the sampling frequency correction information may be calculated based on information about the sampling frequency other than the difference in the sampling frequency.

Using the sampling frequency reference signal input from the sampling frequency reference signal generating section 112 and the sampling frequency correction information input from the sampling frequency correction information calculating section 115, the sampling frequency synthesizer 116 generates a sampling frequency to output to the MM-cell baseband section 117. This Embodiment shows the case of generating 491.52 MHz as the standard sampling frequency of the MM cell of the case including neither error nor correction.

Using the sampling frequency input from the sampling frequency synthesizer 116, the MM-cell baseband section 117 performs coding and decoding of signals. More specifically, the MM-cell baseband section 117 codes a data signal into a baseband signal to output to the MM-cell high-frequency section 107. Further, the MM-cell baseband section 117 decodes a baseband signal input from the MM-cell high-frequency section 107 into a data signal to output.

In addition, such a configuration may be made that the carrier frequency correction information calculating section 105 and sampling frequency correction information calculating section 115 calculate the frequency correction information based on control information from the outside. For example, when the higher node notifies of a control signal to instruct the section to decrease the carrier frequency, the carrier frequency correction information calculating section 105 is capable of calculating the carrier frequency correction information to decrease the carrier frequency, based on the control signal. Further, such a configuration may be made that frequency information of a macro-signal and/or MM signal is received from the outside to calculate the frequency correction information. Furthermore, such a configuration may be made that the frequency correction information is calculated based on frequency correction information notified from the outside.

The configuration of the user terminal will be described next with reference to FIG. 5. As shown in FIG. 5, the user terminal has the carrier frequency reference signal generating section 102, carrier frequency synthesizer 106, MM-cell high-frequency section 107, sampling frequency reference signal generating section 112, sampling frequency synthesizer 116, MM-cell baseband section 117 and macrocell frequency synchronization section 121. Each section indicated by the same reference numeral as in FIG. 4 has the same configuration, and therefore, descriptions thereof will be omitted below. In addition, as long as the same function is capable of being achieved, another configuration may be made.

The macrocell frequency synchronization section 121 receives a macro-signal, and executes frequency synchronization with the macrocell. In frequency synchronization with the macrocell, the section uses a carrier frequency reference signal generated in the carrier frequency reference signal generating section 102, and a sampling frequency reference signal generated in the sampling frequency reference signal generating section 112. The section outputs the carrier frequency and sampling frequency of the macrocell acquired in the process for executing frequency synchronization to the carrier frequency synthesizer 106 and sampling frequency synthesizer 116, respectively. In addition, the macrocell frequency synchronization section 121 may have a configuration including the macrocell high-frequency section 101, macrocell baseband section 111 and the like as shown in FIG. 4. In addition, a wide-area cell frequency synchronization section in this Embodiment is comprised of the macrocell frequency synchronization section 121.

The carrier frequency synthesizer 106 and sampling frequency synthesizer 116 generate a carrier frequency and sampling frequency of the MM cell, using the input carrier frequency and sampling frequency of the macrocell as a reference signal, respectively. Herein, it is assumed that a multiplication rate of the reference signal by each synthesizer is beforehand determined. For example, the multiplication rate may be a common fixed multiplication rate in the MM base station and user terminal, or may be a multiplication rate determined with a common predetermined rule. Further, determination of the multiplication rate of the reference signal by each synthesizer is not limited to the aforementioned description. For example, it is possible to determine with a control signal from the higher node. Further, such a configuration may be made that information on control for each synthesizer is included in the macro-signal or MM signal and notified and that the user terminal determines the multiplication rate according to the information.

As described above, with the configurations of the MM base station and user terminal according to this Embodiment, in an environment in which a plurality of radio communication systems with different frequencies exists, by performing frequency synchronization with only a wide-area cell (macrocell and the like) where the user terminal exists, the terminal is capable of achieving frequency synchronization also with a narrow-area cell (MM cell and the like) existing inside the wide-area cell. Therefore, even in the case where the user terminal concurrently communicates with a plurality of radio communication systems, the terminal is required to be provided with only a circuit for frequency synchronization corresponding to one radio communication system, and is capable of readily achieving frequency synchronization with each of the radio communication systems.

(Modification 1)

Figure 6:
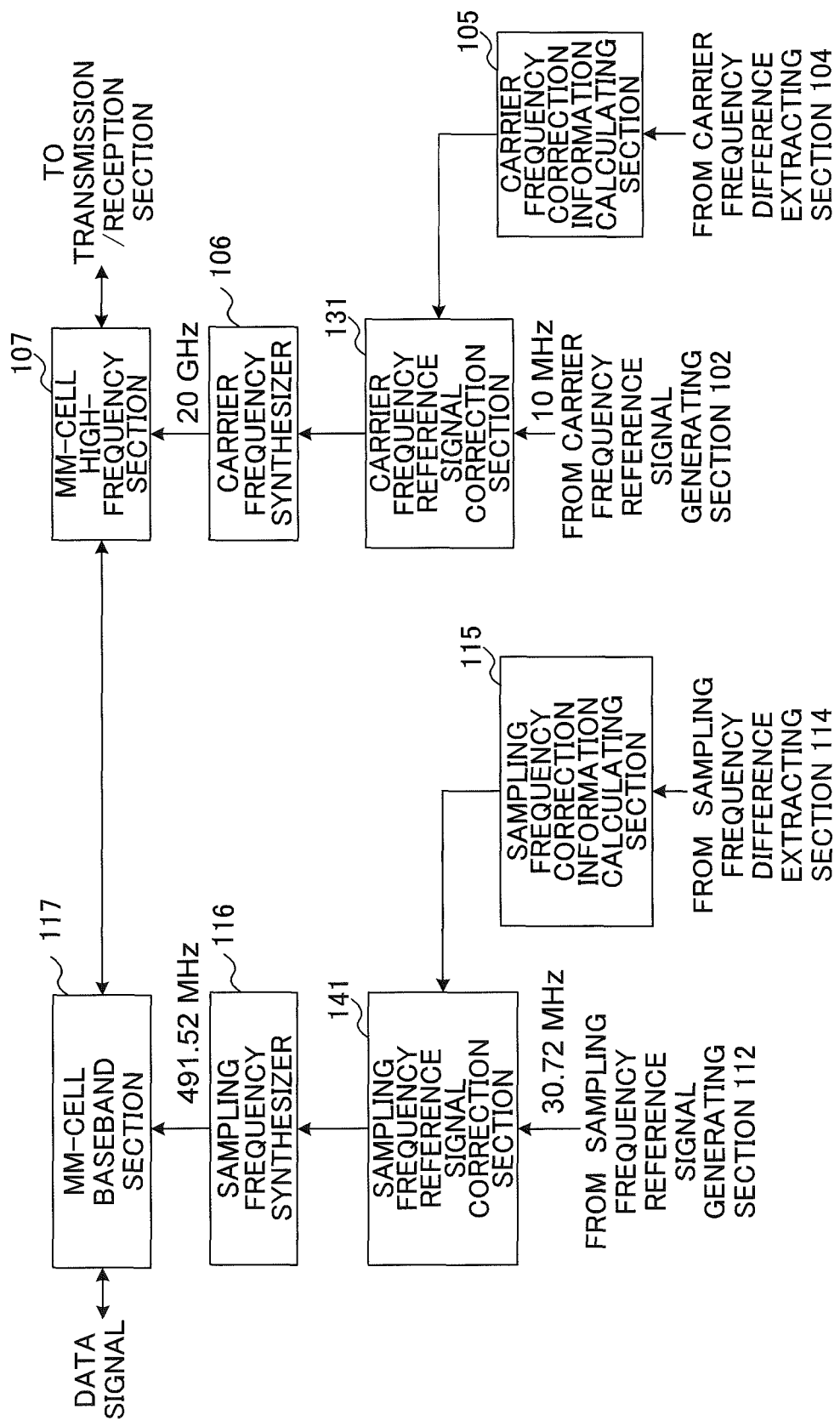
FIG. 6 is a block diagram showing one example of a different configuration of the radio base station according to this Embodiment.

In this Embodiment, the MM base station is capable of performing frequency correction also by correcting the reference signal input to the frequency synthesizer. By adopting this configuration, the configuration shown in FIG. 4 is made a configuration as shown in FIG. 6. In addition, in FIG. 6, portions that are not shown in the figure are the same as in FIG. 4. A carrier frequency reference signal correction section 131 and sampling frequency reference signal correction section 141 in FIG. 6 correct the reference signal, based on input from the carrier frequency correction information calculating section 105 and sampling frequency correction information calculating section 115, respectively. For example, when the carrier frequency reference signal correction section 131 calculates that a difference of 14.3 kHz exists in the reference signal of the MM base station, the section makes a correction of 14.3 kHz to the reference signal input from the carrier frequency reference signal generating section 102 to output to the carrier frequency synthesizer 106. Further, without performing the correction of the carrier, a correction by digital signal processing may be made to the baseband signal.

(Modification 2)

Figure 7:
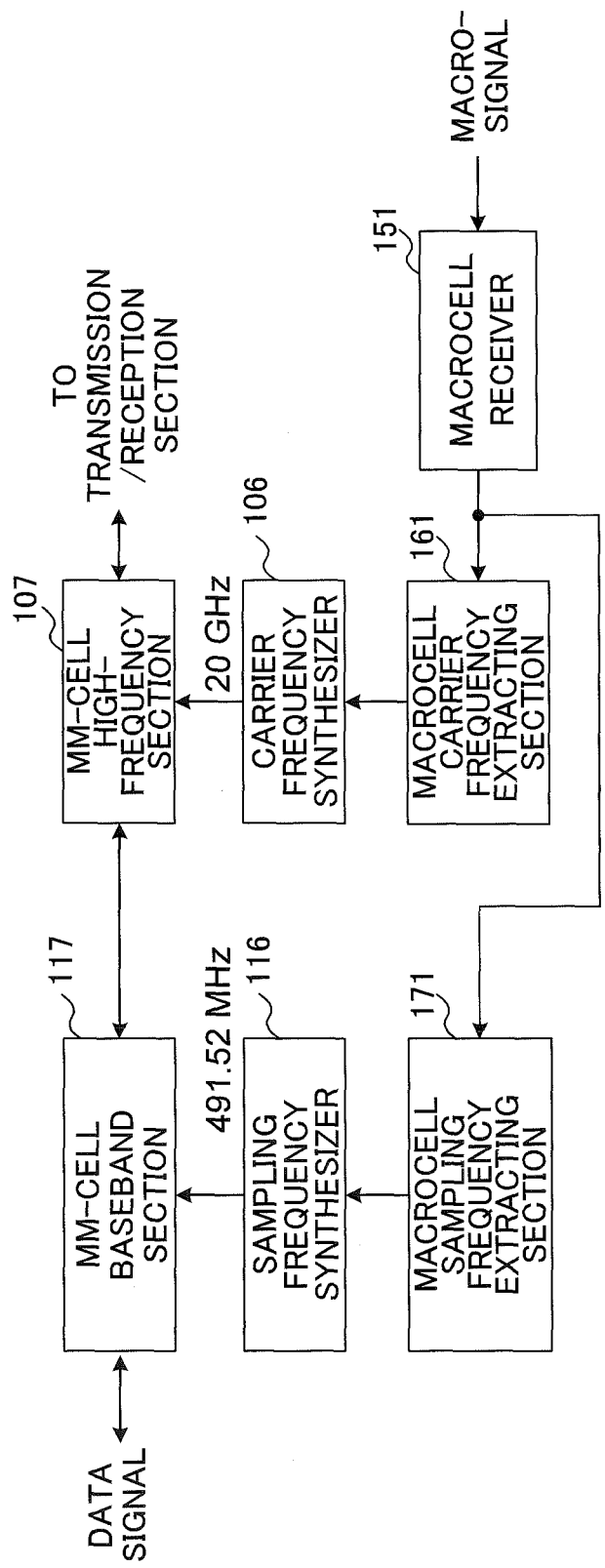
FIG. 7 is a block diagram showing one example of another different configuration of the radio base station according to this Embodiment.

Further, the MM base station may extract a carrier signal from a macro-signal to use the carrier signal as a reference signal. By adopting this configuration, the configuration shown in FIG. 4 is simplified to a configuration as shown in FIG. 7. In FIG. 7, the macro-signal is received in a macrocell receiver 151 having the capability of receiving the macro-signal. The received macro-signal is output to a macrocell carrier frequency extracting section 161 that extracts a carrier frequency, and a macrocell sampling frequency extracting section 171 that extracts a sampling frequency. The macrocell carrier frequency extracted in the macrocell carrier frequency extracting section 161 is output to the carrier frequency synthesizer 106. Further, the macrocell sampling frequency extracted in the macrocell sampling frequency extracting section 171 is output to the sampling frequency synthesizer 116. According to this configuration, since the need is eliminated particularly for the carrier frequency reference signal generating section 102 and sampling frequency reference signal generating section 112, the configuration of the MM base station is simplified.

(Modification 3)

Figure 8:
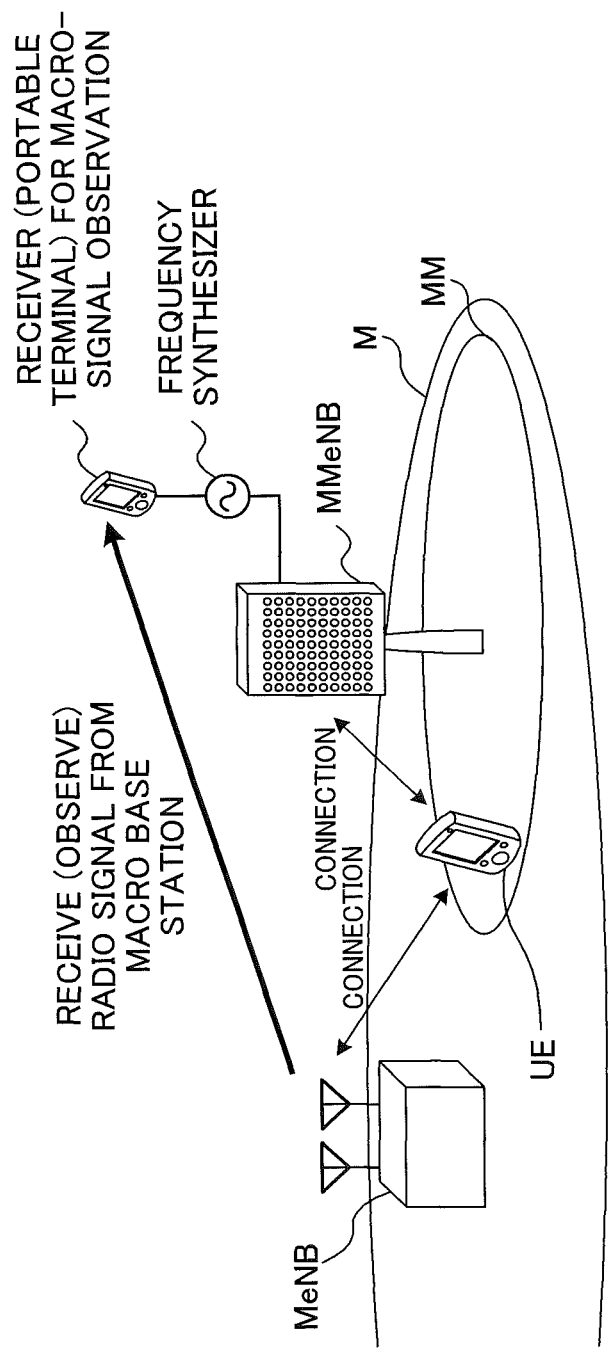
FIG. 8 is an explanatory diagram showing one example of a configuration where a portable terminal is used as a receiver for macro-signal observation in the radio base station according to this Embodiment.

Furthermore, in this Embodiment, portions concerning reception of macro-signal such as the macrocell high-frequency section 101, the macrocell baseband section 111, the macrocell receiver 151 of Modification 2 and the like may be made a configuration included in an external apparatus (reception apparatus) connected to the MM base station by cable or radio. For example, FIG. 8 shows an example of using a portable terminal as a receiver for macro-signal observation. In the example as shown in FIG. 8, the portable terminal executes reception processing of a macro-signal at predetermined intervals, and outputs the received macro-signal to the wired-connected MM base station. The macro-signal obtained from the portable terminal is input to the carrier frequency difference extracting section 104, the sampling frequency difference extracting section 114, the macrocell carrier frequency extracting section 161 and macrocell sampling frequency extracting section 171 of Modification 2, and the like. According to this configuration, the need is eliminated for directly having the function of receiving the macro-signal in the MM base station, and the configuration of the MM base station is thereby simplified.

Figure 9:
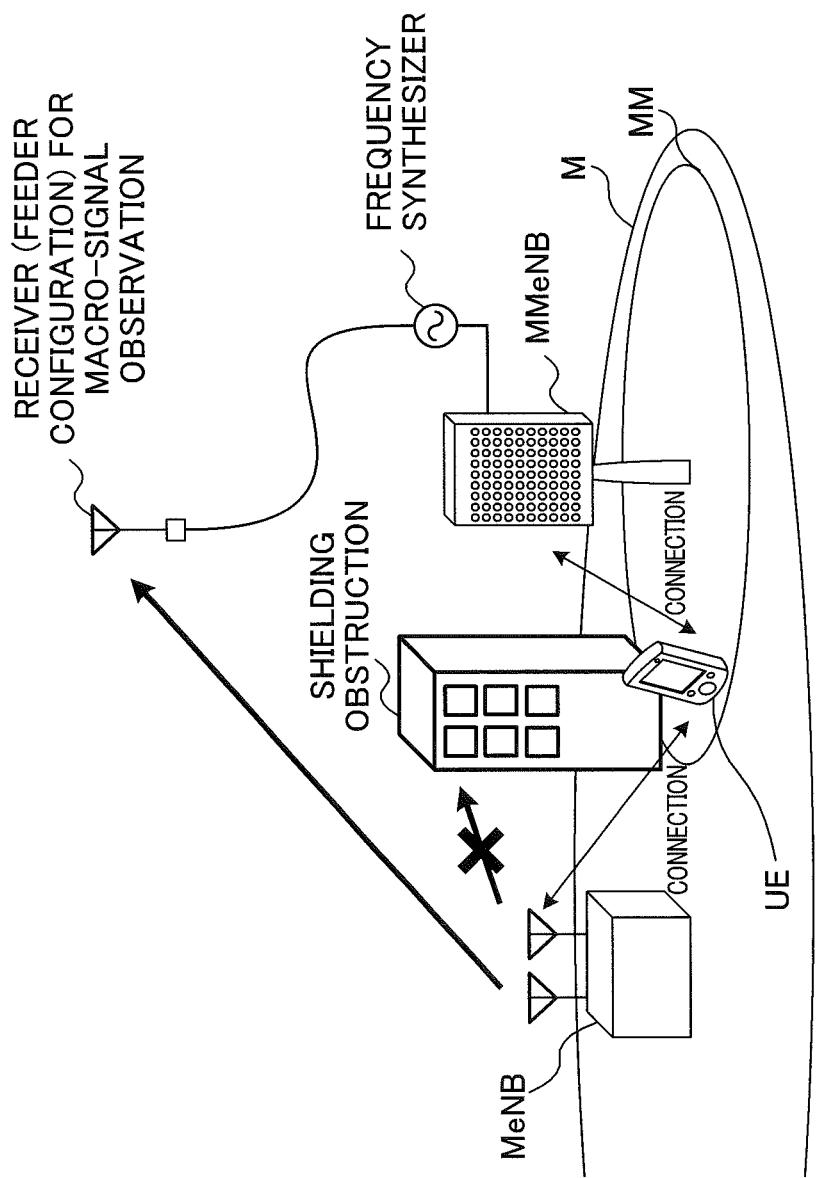
FIG. 9 is an explanatory diagram showing one example of a configuration where the receiver for macro-signal observation is connected with an optical feeder configuration in the radio base station according to this Embodiment.

Still furthermore, the above-mentioned portions concerning reception of macro-signal may be disposed at a place geographically away from the MM base station. For example, FIG. 9 shows an example in which a receiver for macro-signal observation is connected to the MM base station with an optical feeder configuration, and is disposed at a place geographically away. In the example of FIG. 9, since a shielding obstruction (building or the like) exists between the macro base station and the MM base station, it is difficult to receive the macro-signal with high quality in the position of the MM cell. On the other hand, when the reception quality of the macro-signal is high in the position of the fed receiver, the MM base station uses the macro-signal received in the receiver, and is thereby capable of performing the frequency correction processing suitably. In addition, FIG. 9 shows one fed receiver, and a configuration for feeding a plurality of receivers may be made.

(Modification 4)

Figure 10:
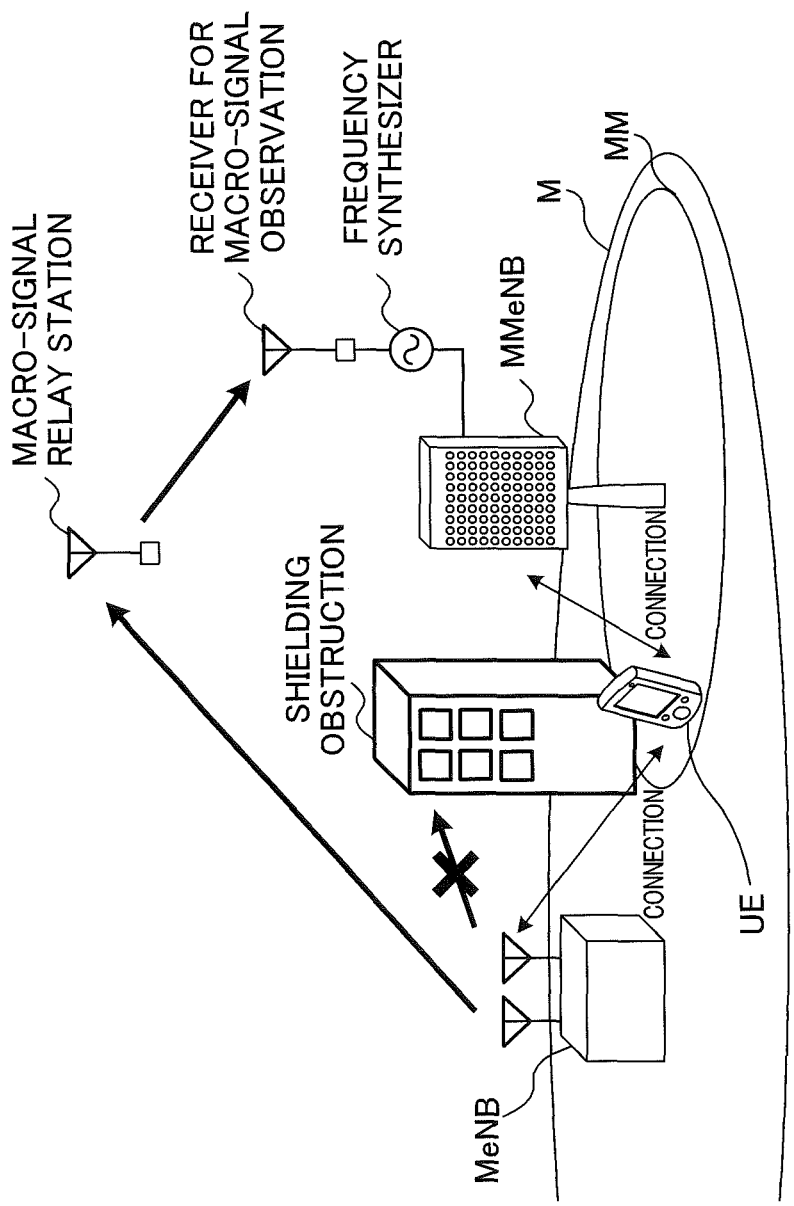
FIG. 10 is an explanatory diagram showing one example of a configuration where a macro-signal relay apparatus (relay station) is disposed on the periphery of the radio base station according to this Embodiment.

Moreover, such a configuration may be made that a macro-signal is received from an apparatus except the macro base station. For example, FIG. 10 shows an example with a macro-signal relay apparatus (also called the relay station) disposed. In the example of FIG. 10, as in FIG. 9, a shielding obstruction exists between the macro base station and the MM base station. On the other hand, when the relay station is capable of receiving the macro-signal, the relay station relays and transmits the received macro-signal to the MM base station, and the MM base station is thereby capable of performing the frequency correction processing suitably. As the relay station, for example, it is possible to use a repeater, booster and the like for amplifying a received signal to transmit.

Figure 11:
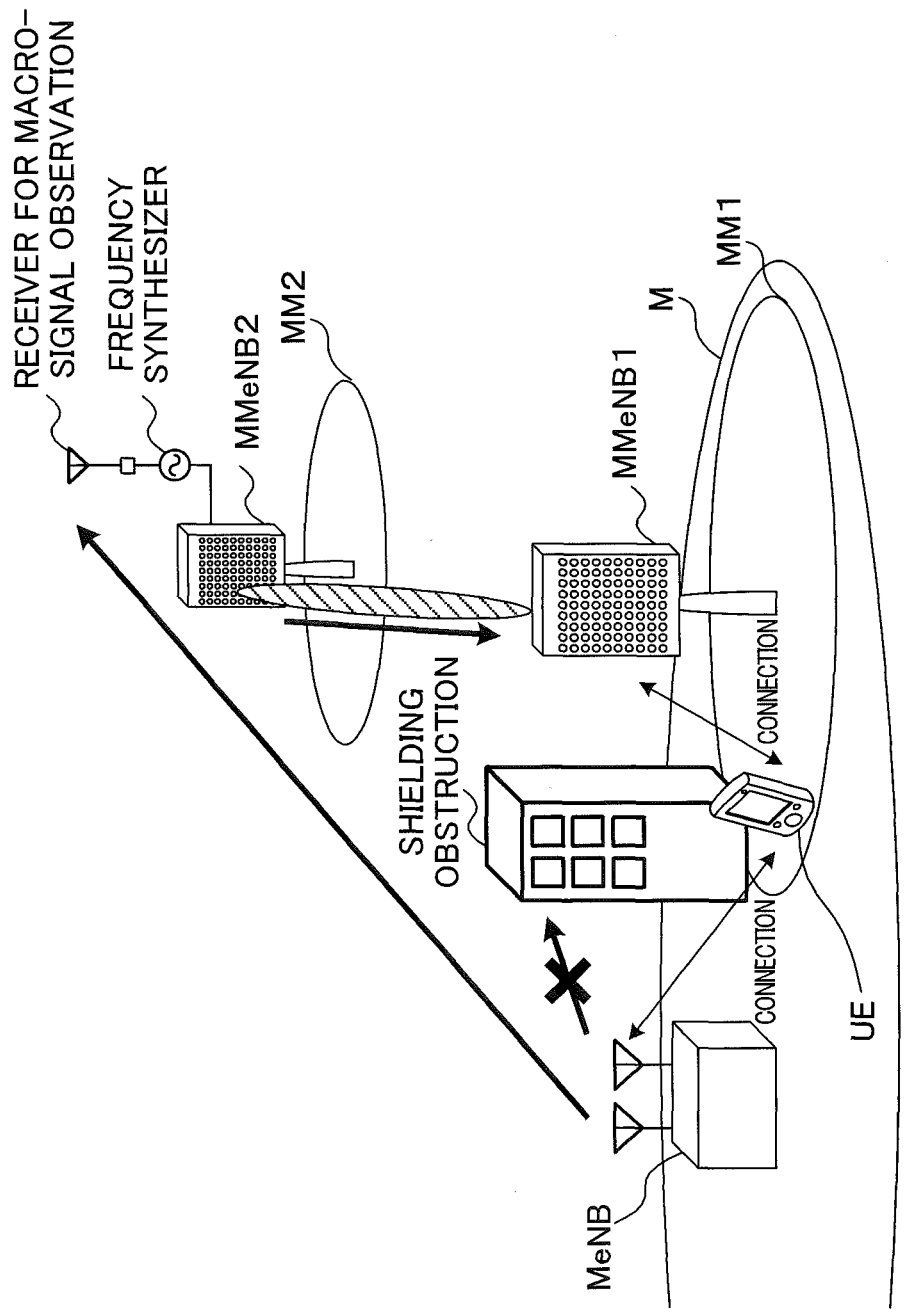
FIG. 11 is an explanatory diagram showing one example of a configuration where another MM base station (MMeNB 2) is disposed on the periphery of the radio base station according to this Embodiment.

Further, in the case where a plurality of MM base stations of this Embodiment is disposed, and is capable of communicating with one another, the base stations are capable of performing the frequency correction processing in cooperation with each other. FIG. 11 shows an example where a plurality of MM base stations of this Embodiment is disposed. In the example of FIG. 11, as in FIG. 9, a shielding obstruction exists between the macro base station and the MM base station (MMeNB 1). On the other hand, when the other MM base station (MMeNB 2) receives a macro-signal and already executes the frequency correction, the MMeNB 1 may receive an MM signal from the MMeNB 2 and execute the frequency correction based on the signal. Furthermore, the frequency correction may be executed based on information included in the signal. In addition, in the Massive-MIMO cell MM 1 formed with the MMeNB 1 and the Massive-MIMO cell MM 2 formed with the MMeNB 2, their ranges are not overlapped in a predetermined beam width as shown in FIG. 11, and by configuring so that the ranges are overlapped in a different beam width, it is possible to perform transmission of MIMO signals.

(Modification 5)

Furthermore, in this Embodiment, the MM base station has two reference signal generating sections for the carrier and sampling of the baseband signal (see FIG. 4 as described above), and the two reference signal generating sections may be made a common section to be used as a single reference signal generating section. For example, in FIG. 4 as described above, the carrier frequency reference signal generating section 102 and sampling frequency reference signal generating section 112 may be made a common section. Further, such a configuration may be made that frequency conversion is performed on a reference signal with a low frequency in two reference signals to generate a reference signal with a high frequency. According to the configuration, it is possible to decrease the number of reference signal generating sections, and it is possible to reduce the circuit scale of the MM base station. Furthermore, also in the user terminal, the carrier frequency reference signal generating section 102 and sampling frequency reference signal generating section 112 may be made a common section to reduce the circuit scale of the user terminal.

In addition, the present invention is not limited to the above-mentioned Embodiment, and is capable of being carried into practice with various modifications thereof. For example, without departing from the scope of the invention, the number of processing sections, processing procedure and the like in the above-mentioned description are capable of being carried into practice with modifications thereof as appropriate. Moreover, the invention is capable of being carried into practice with modifications thereof as appropriate without departing from the scope of the invention.

The present application is based on Japanese Patent Application No. 2013-212301 filed on Oct. 9, 2013, entire content of which is expressly incorporated by reference herein.

The invention claimed is:

1. A radio base station for forming a narrow-area cell to communicate with a user terminal in a radio communication system where the narrow-area cell is provided inside a wide-area cell, comprising:
   a carrier frequency synthesizer that generates a carrier frequency of the narrow-area cell based on a wide-area radio signal transmitted from a radio base station for forming the wide-area cell; and
   a sampling frequency synthesizer that generates a sampling frequency of a baseband signal of the narrow-area cell based on the wide-area radio signal,
   wherein the carrier frequency of the narrow-area cell and the sampling frequency of the baseband signal of the narrow-area cell are generated based on a carrier frequency of the wide-area cell and a sampling frequency of a baseband signal of the wide-area cell, that are acquired in frequency synchronization with the wide-area cell based on the wide-area radio signal in the user terminal.

2. The radio base station according to claim 1, further comprising:
   a reference signal generating section that generates a reference signal;
   a carrier frequency correction information calculating section that calculates carrier frequency correction information which is information to correct a carrier frequency of the narrow-area cell, based on the wide-area radio signal; and
   a sampling frequency correction information calculating section that calculates sampling frequency correction information which is information to correct a sampling frequency of a baseband signal of the narrow-area cell, based on the wide-area radio signal,
   wherein the carrier frequency synthesizer generates a carrier frequency of the narrow-area cell based on the reference signal and the carrier frequency correction information, and
   the sampling frequency synthesizer generates a sampling frequency of a baseband signal of the narrow-area cell based on the reference signal and the sampling frequency correction information.

3. The radio base station according to claim 2, further comprising:
   a carrier frequency difference extracting section that extracts a carrier frequency difference which is a difference between a carrier frequency of the wide-area cell acquired from the wide-area radio signal and a carrier frequency of the wide-area cell generated based on the reference signal; and
   a sampling frequency difference extracting section that extracts a sampling frequency difference which is a difference between a sampling frequency of a baseband signal of the wide-area cell acquired from the wide-area radio signal and a sampling frequency of a baseband signal of the wide-area cell generated based on the reference signal, wherein the carrier frequency correction information calculating section calculates carrier frequency correction information using the carrier frequency difference, and the sampling frequency correction information calculating section calculates sampling frequency correction information using the sampling frequency difference.

4. The radio base station according to claim 1, further comprising:

a macrocell carrier frequency extracting section that extracts a carrier frequency of the wide-area cell from the wide-area radio signal; and a macrocell sampling frequency extracting section that extracts a sampling frequency of a baseband signal of the wide-area cell from the wide-area radio signal, wherein the carrier frequency synthesizer generates a carrier frequency of the narrow-area cell, using an extracted carrier frequency of the wide-area cell, and the sampling frequency synthesizer generates a sampling frequency of a baseband signal of the narrow-area cell, using an extracted sampling frequency of a baseband signal of the wide-area cell.

5. The radio base station according to claim 1, wherein the radio base station is connected to a reception apparatus for receiving the wide-area radio signal via a cable or radio, and acquires the wide-area radio signal from the reception apparatus.

6. The radio base station according to claim 5, wherein the radio base station is connected to the reception apparatus with an optical feeder configuration.

7. The radio base station according to claim 1, wherein the wide-area radio signal is received from a relay apparatus that relays the wide-area radio signal via radio.

8. The radio base station according to claim 1, wherein the carrier frequency synthesizer generates a carrier frequency of the narrow-area cell, based on a signal transmitted from a radio base station for forming an other narrow-area cell, the sampling frequency synthesizer generates a sampling frequency of a baseband signal of the narrow-area cell, based on a signal transmitted from the radio base station for forming the other narrow-area cell, and a carrier frequency and a sampling frequency of a baseband signal of the signal transmitted from the radio base station for forming the other narrow-area cell are generated based on the wide-area radio signal.

9. A user terminal that communicates with a radio base station for forming a narrow-area cell and a radio base station for forming a wide-area cell in a radio communication system where the narrow-area cell is provided inside the wide-area cell, comprising:

a wide-area cell frequency synchronization section that executes frequency synchronization with the wide-area cell, based on a wide-area radio signal transmitted from the radio base station for forming the wide-area cell;

a carrier frequency synthesizer that generates a carrier frequency of the narrow-area cell, based on a carrier frequency of the wide-area cell acquired in the wide-area cell frequency synchronization section; and a sampling frequency synthesizer that generates a sampling frequency of a baseband signal of the narrow-area cell, based on a sampling frequency of a baseband signal of the wide-area cell acquired in the wide-area cell frequency synchronization section.

10. A radio communication method in which a user terminal communicates with a radio base station for forming a narrow-area cell and a radio base station for forming a wide-area cell in a radio communication system where the narrow-area cell is provided inside the wide-area cell, comprising the steps of:

in the radio base station for forming the narrow-area cell, generating a carrier frequency of the narrow-area cell, based on a wide-area radio signal transmitted from the radio base station for forming the wide-area cell;

generating a sampling frequency of a baseband signal of the narrow-area cell, based on the wide-area radio signal;

in the user terminal, executing frequency synchronization with the wide-area cell based on the wide-area radio signal;

generating a carrier frequency of the narrow-area cell, based on a carrier frequency of the wide-area cell acquired by frequency synchronization with the wide-area cell; and generating a sampling frequency of a baseband signal of the narrow-area cell, based on a sampling frequency of a baseband signal of the wide-area cell acquired by frequency synchronization with the wide-area cell.

11. The radio base station according to claim 1, wherein different frequency bands are used between the wide-area cell and the narrow-area cell.

\* \* \* \* \*